(12) United States Patent
Carter et al.

(10) Patent No.: US 8,873,771 B2
(45) Date of Patent: Oct. 28, 2014

(54) AUTOMATIC VOLUME ADJUSTMENT

(75) Inventors: Bernadette Alexia Carter, Raleigh, NC (US); Al Chakra, Apex, NC (US); Oriana Jeannette Love, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 13/104,493

(22) Filed: May 10, 2011

(65) Prior Publication Data

US 2012/0291053 A1 Nov. 15, 2012

(51) Int. Cl.
*H03G 3/00* (2006.01)
*G06F 3/0481* (2013.01)
*G06F 3/16* (2006.01)

(52) U.S. Cl.
CPC .............. *G06F 3/165* (2013.01); *G06F 3/0481* (2013.01)
USPC ............................. 381/104; 381/107; 715/727

(58) Field of Classification Search
CPC ....... G06F 3/16; G06F 3/0481; G06F 9/4443; G06F 3/165; G11B 2020/10546; H03G 3/001; H03G 3/002; H03G 3/32; H03G 3/3089; H04H 20/88; H04S 3/00; H04S 5/02; H04S 7/302; H04S 1/007; H04N 5/607; H04N 5/642; G10K 2210/1081; G10K 11/175; H04R 5/033; H04R 27/04; H04R 2420/07; H04R 3/12; H04R 5/02

USPC ............. 381/18, 19, 309, 310, 306, 2, 70–80, 381/85, 61, 123, 104, 107; 715/729, 800; 700/94

See application file for complete search history.

(56) References Cited

U.S. PATENT DOCUMENTS

| 7,343,566 | B1* | 3/2008 | Chaudhri et al. ............. 715/781 |
| 7,624,259 | B2 | 11/2009 | Bear et al. |
| 2006/0236255 | A1* | 10/2006 | Lindsay et al. ............... 715/766 |
| 2008/0288876 | A1 | 11/2008 | Fleming |
| 2009/0259942 | A1 | 10/2009 | Bitonti et al. |
| 2010/0293468 | A1 | 11/2010 | Thijssen |
| 2012/0245718 | A1* | 9/2012 | Condit et al. ................... 700/94 |

* cited by examiner

*Primary Examiner* — Vivian Chin
*Assistant Examiner* — Friedrich W Fahnert
(74) *Attorney, Agent, or Firm* — Steven L. Nichols; Van Cott, Bagley, Cornwall & McCarthy P.C.

(57) ABSTRACT

A method for automatic volume adjustment performed by a physical computing system includes, with the computing system, determining a virtual proximity between a user and a number of applications running on the computing system, the virtual proximity based in part on a type of one of the number of applications, and with the computing system, automatically adjusting a volume of the number of applications linked with a sound peripheral connecting to the computing system, the volume of each of the number of applications being based on the virtual proximity.

20 Claims, 5 Drawing Sheets

Table
(400)

| Application | Proximity | Volume |
|---|---|---|
| Music (408) | 1 | Normal |
| Chat (410) | 2 | Lower |
| Web Browser (412) | 3 | Lower |

402 — Application
404 — Proximity
406 — Volume

Table
(416)

| Application | Ranking | Volume |
|---|---|---|
| Voice Communication (414) | 1 | Normal |
| Music (408) | 2 | Muted |
| Chat (410) | 3 | Lower |
| Web Browser (412) | 4 | Lower |

402 — Application
404 — Ranking
406 — Volume

500

With a computing system, determine a virtual proximity between a user and a number of applications running on the computing system, the virtual proximity based in part on a type of one of the number of applications
(block 502)

With the computing system, automatically adjust a volume of the number of applications linked with a sound peripheral connecting to the computing system, the volume of each of the number of media applications being based on the virtual proximity
(block 504)

*Fig. 5*

AUTOMATIC VOLUME ADJUSTMENT

BACKGROUND

Aspects of the present invention relate, in general, to adjusting the volume of the audio output for an application executing on a computing system, and more particularly, to methods and systems for automatically adjusting the volume for multiple applications.

A user of a computing system often runs multiple applications simultaneously. These applications often produce either an audio output that is sent to a number of speakers or receive an audio input from a microphone. Some applications, such as music and other media players, typically produce a steady stream of sound. Alternatively, some applications only occasionally produce a sound. For example, some applications only produce a sound as an alert or response to a user action.

While using these applications, it can be difficult for a user to manage the volume settings for each application manually. For example, there are times when the user may wish to lower the volume on one application in favor of another. This is particularly the case for voice communication applications. For example, when the user is communicating with another person through a Voice over Internet Protocol (VoIP) application, the user may wish to reduce or mute the volume for the other applications.

BRIEF SUMMARY

A method for automatic volume adjustment performed by a physical computing system includes, with the computing, system, determining a virtual proximity between a user and a number of applications running on the computing system, the virtual proximity based in part on a type of one of the number of applications, and with the computing system, automatically adjusting a volume of the number of applications linked with a sound peripheral connecting to the computing system, the volume of each of the number of media applications being based on the virtual proximity.

A computing system includes a processor and a memory communicatively coupled to the processor. The processor is configured to determine a virtual proximity between a user and a number of applications running on the computing system, the virtual proximity based in part on a type of one of the number of applications, and automatically adjust a volume of the number of applications linked with a sound peripheral connecting to the computing system, the volume of each of the number of media applications being based on the virtual proximity.

A computer program product for automatic volume adjustment includes a computer readable storage medium having computer readable code embodied therewith. The computer readable program code includes computer readable program code configured to determine a virtual proximity between a user and a number of applications running on the computing system, the virtual proximity based in part on a type of one of the number of applications, and computer readable program code configured to automatically adjust a volume of the number of applications linked with a sound peripheral connecting to the computing system, the volume of each of the number of media applications being based on the virtual proximity.

BRIEF DESCRIPTION OF TEE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 5 is a flowchart showing an illustrative method for automatic volume adjustment, according to one example of principles described herein.

Throughout the drawings, identical reference numbers designate similar, but not necessarily identical, elements.

DETAILED DESCRIPTION

Figure 1:
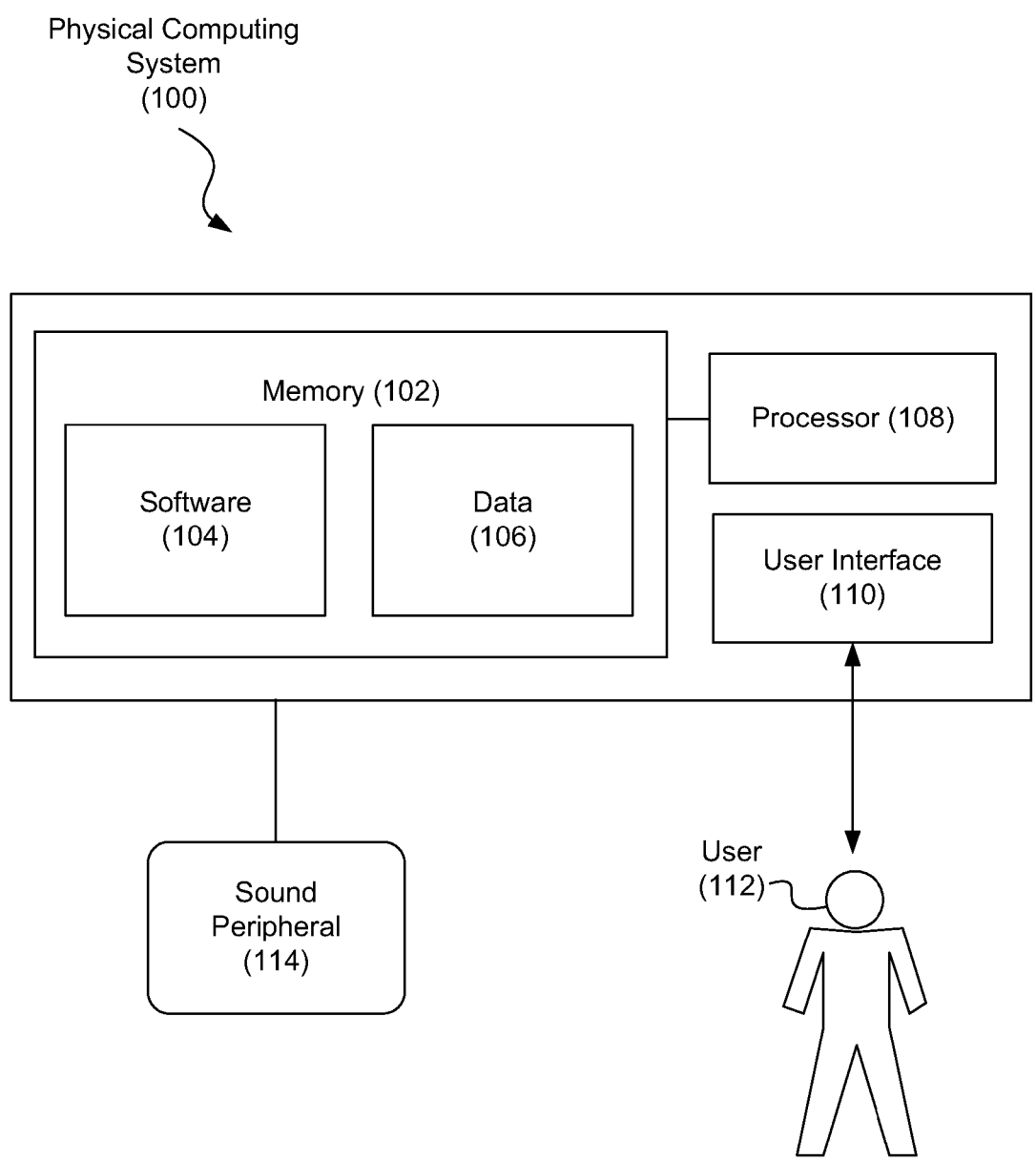
FIG. 1 is a diagram showing an illustrative physical computing system, according to one example of principles described herein.

The present specification relates to methods and systems for automatic volume adjustment of multiple applications executing on a computer or computing system. According to certain illustrative examples, each application currently running is assigned a virtual proximity ranking. In general, the greater the virtual proximity to a user, the lower the volume for that application will be. The virtual proximity of a particular application is determined through a variety of factors including the type of application. For example, if a voice communication application and a music application are both running, then the music application will be muted or reduced to an ambient level so that the user can better communicate with whoever is on the other end of the voice communication application.

In some cases, a user may have several voice communication applications or several instances of a single voice communication application running. The virtual proximity for each of the instances can be determined through a variety of factors such as recentness use or placement of the application relative to the overall user interface. The application with the closest virtual proximity can have the recording volume of the microphone set the highest. Thus, the microphone will be most sensitive for the virtually closest instance. The microphone volume for the other voice communication applications can be either reduced or muted.

Through use of methods and systems embodying principles described herein, a user may switch focus between multiple running applications without having to manually adjust the volume. This will save the user time and effort. Furthermore, the user can be provided with a way to customize the automatic volume adjustment application so that certain applications will always be virtually closer than others. This allows a user to fit the volume adjustment application to his or her specific needs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the figures, FIG. 1 is a diagram showing an illustrative physical computing system (100). According to certain illustrative examples, the physical computing system (100) includes a memory (102) having software (104) and data (106) stored thereon. The physical computing system (100) also includes a processor (108) and a user interface (110).

There are many types of memory available. Some types of memory, such as hard drives and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the computing system. The other applications may include a volume adjustment application as well as several other types of applications that involve either producing or recording sound.

A user interface (110) may provide a means for the user (112) to interact with the physical computing system (100). The user interface may include any collection of devices for interfacing with a human user (112). For example, the user interface (110) may include an input device such as a keyboard or touchpad and an output device such as a monitor.

Figure 2:
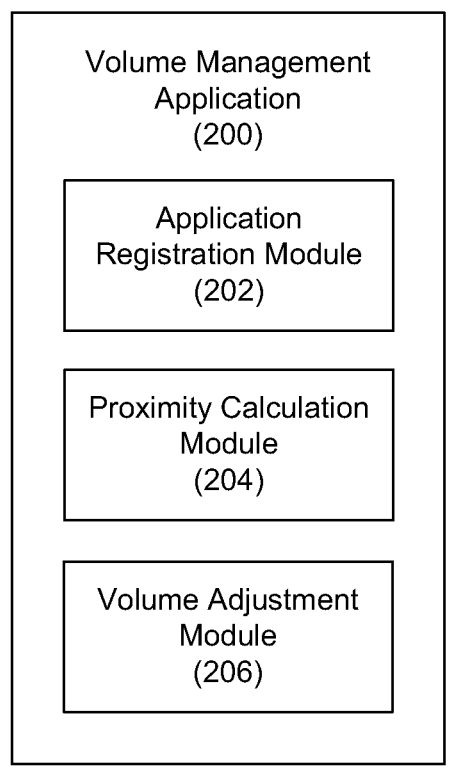
FIG. 2 is a diagram showing illustrative components of a volume management application, according to one example of principles described herein.

FIG. 2 is a diagram showing illustrative components of a volume management application (200). According to certain illustrative examples, the volume management application (200) includes an application registration module (202), a proximity calculation module (204), and a volume adjustment module (206). The following will describe the role of these modules.

The application registration module (202) determines which applications running on a particular computing system (e.g. 100, FIG. 1) involve either sound output to a speaker or sound input from a microphone. In some cases, a particular application may include a number of sub-applications that involve sound output or input.

For example, a web browser application may allow a user to have multiple tabs open at a time. Each tab may be used for a different web-based application including an interim radio application, a text chat application, a computer game, and a voice communication application. Each of these applications, although distinct, is run through a single web-browser application. Thus, the application registration module (202) may treat each tab within the web-browser as a different application.

The application registration module (202) may determine which applications or sub-applications involve sound by interfacing with the operating system. An operating system typically keeps track of which processes are interfacing with the sound hardware associated with the computing system. In some cases, a user may manually register particular applications or sub-applications with the volume management application (200).

The proximity calculation module (204) determines the virtual proximity between a user and the sound related applications that are currently being run by the computing system. In this model, applications that need to have a louder audio output or a more sensitive audio input are ranked as being closer to the user than application that do need as loud an audio output or as sensitive an audio input. Thus, the virtual proximity represents how "close" an application is to a user and thus sounds produced by that application are louder than sounds produced by applications that are "farther" away from a user. Furthermore, an application that is recording sound causes the microphone to be more sensitive if that application is virtually closer to the user.

Several factors may be used to determine the preferred audio settings for and application, i.e., the virtual "proximity" between an application and the user. In one case, the type of application may be the primary factor in determining virtual proximity. For example, a voice communication application may receive priority over a music application. A voice communication application is one that allows communication between two different users through use of a microphone and speakers connected to each user's computing system. In one scenario, a user may be listening to music while working on his computing device. When a voice communication call comes in, the user may want to minimize or mute the volume of the music application and give full volume to the voice communication application.

The proximity calculation module (204) can distinguish between applications that are active or inactive. A particular application may be running but not performing any functions that use produce or record sound. For example, a voice communication application may be open and running but no voice call may be in progress. In a further example, a media player application may be open and running but no music may be playing. If an application is inactive, then the proximity calculation module (204) may not need to determine the virtual proximity of that application in comparison to the others that are active.

The proximity calculation module (204) may determine the virtual proximity of several instances of the same application or sub-applications. For example, a user may be involved in multiple VoIP calls simultaneously. Each call may be represented by a different instance of the VoIP call application. Each instance may be represented by a window within the user interface display. In one example, the window that has been most recently used may be the closest in virtual proximity to the user.

The instance of the voice communication application that is virtually the closest to the user may have its volume set the highest. Thus, other applications are muted or have only ambient volume level to avoid interfering with the voice communication application in use.

Additionally, when the user speaks into his or her microphone, the input from the microphone may be provided with full sensitivity only to the close instances of the voice communication application and with lesser sensitivity or not at all to the other applications or instances of the VoIP application. This would be similar to the situation where a person is conducting two phone calls on two different phone lines and sets one phone down or holds it away while speaking on the other line. Thus, the person on the other end of the call with greatest virtual proximity will hear the user's voice louder than will persons on the other end of the call for the virtually farther instances of the voice communication application. In some cases, only the microphone volume may change between the different instances and the speaker volume may stay the same.

The volume adjustment module (206) actually makes the adjustments to the volume of each application based on the virtual proximity as determined by the proximity calculation module (204). The volume associated with each application may be changed each time there is a change in virtual proximity between any of the applications. The degree to which the volume of each application is adjusted may be unique to that application or may be based on its virtual proximity to the user. For example, a text chat application that beeps to inform the user that he or she has received a message may not ever need to be very loud. Thus, even if the text chat application is the closest in virtual proximity, it may still not be as loud as a music or voice communication application that is further away in virtual proximity.

Figure 3:
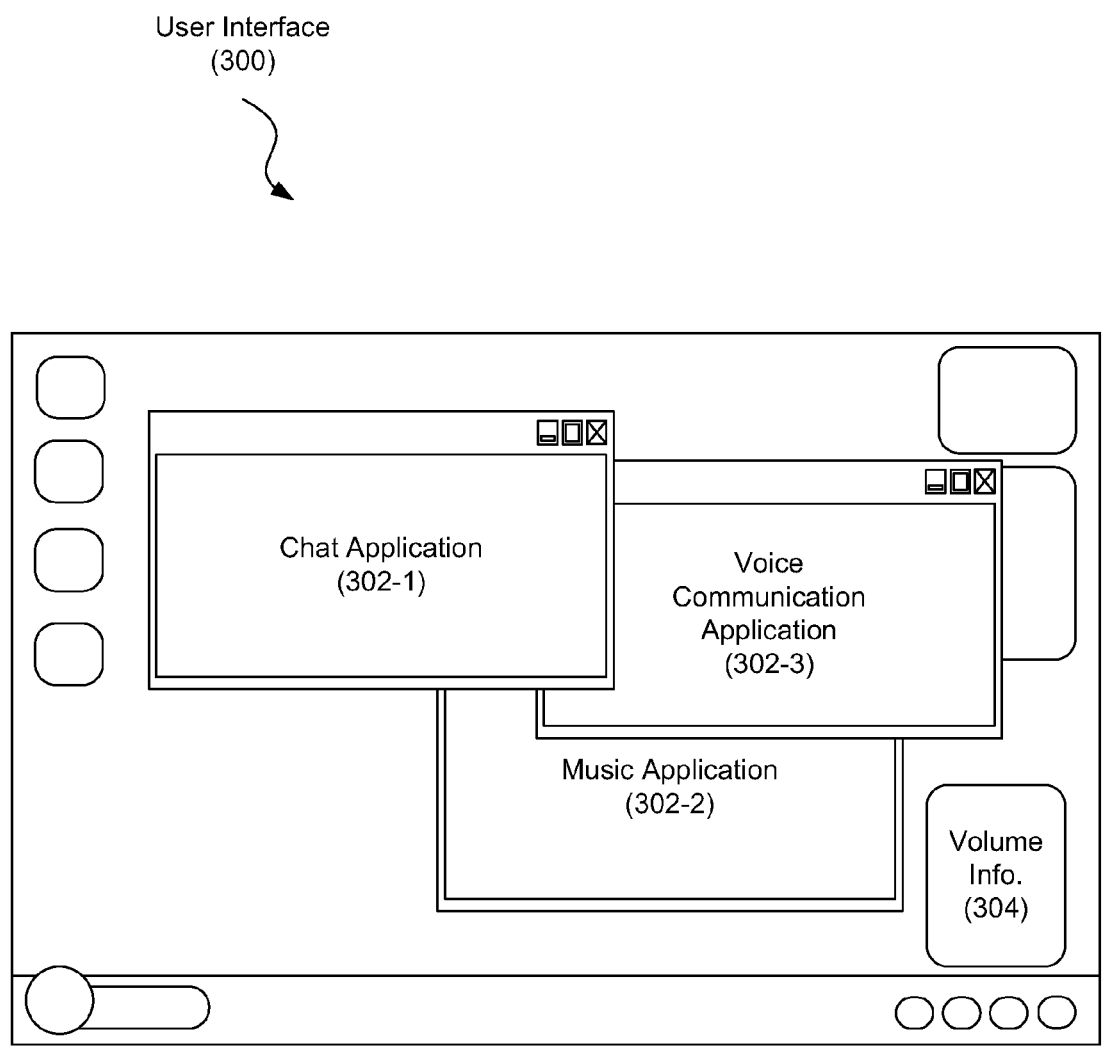
FIG. 3 is a diagram showing an illustrative user interface for a system utilizing the volume management application.

FIG. 3 is a diagram showing an illustrative user interface (300) for a system utilizing a volume management application as described herein. The virtual proximity of an application (302) may be affected by a number of different factors, in the example illustrated in FIG. 3, a chat application (302-1), a music application (302-2), and a voice communication application (302-3) may be running on a computing system. Each of these applications corresponds to a window displayed on the screen of a user interface.

in some cases, the virtual proximity may be affected by the placement of the application within the user interface (300). For example, applications placed more to the left may be considered virtually closer than applications toward the right. In this case, the order of virtual proximity would be the chat application (302-1), the music application (302-2), and the voice communication application (302-3). In some cases, the applications placed closer to the top would be considered virtually closer than applications toward the bottom. In this case, the order of the virtual proximity would be the chat application (302-1), the voice communication application (302-3), and the music application (302-2).

In some cases, the layering of applications may affect the virtual proximity of each of those applications (302). For example, applications that are on the top layer may be considered virtually closer than the applications on the bottom layer. In many user interfaces, the application on top corresponds with the application that was most recently used. In this example, the order of the virtual proximity would be the chat application (302-1), the voice communication application (302-3), and the music application (302-2).

In any of these examples, the user can then order the application windows according to a desired virtual proximity and consequent volume management.

The types of factors that affect the virtual proximity of an application may be weighted. For example, the type of application may have a relatively large weight and placement of the application may have a relatively small weight. Thus, it may be the case that even though the chat application is on the top layer, the voice communication application (302-3) may be considered to be the virtually closest because of its type.

In some cases, the volume management application (e.g. 200, FIG. 2) may display information relative to the automatic adjustment of volume. This information may be displaying in a volume information window (304). The information within this window (304) may display volume information about all active applications. Alternatively, the volume information may display information associated with a selected application.

For example, the user may select the voice communication application (302-3). The volume information window (304) may then display information to the user about the present virtual proximity of the voice communication application. Additionally, the user may make manual adjustments to the virtual proximity, in one example, the user may set this particular application to always be the virtually closest despite the various factors used in automatically determining virtual proximity. The factors used in the automatic determination of virtual proximity may still be applied to the other applications (302).

Figure 4A:
FIGS. 4A and 4B are diagrams showing illustrative tables of application proximity rankings, according to one example of principles described herein.
Figure 4B:

FIGS. 4A and 4B are diagrams showing illustrative tables (400, 416) of application proximity rankings. FIG. 4A illustrates a first example of the virtual proximities for three different active applications. The table includes an application column (402), a proximity column (404), and a volume column (406).

The three initial active applications are a music application (408), a chat application (410), and a web browser (412). Based on a number of factors, including the type of application, the music application (408) is the virtually closest to the user followed by the chat application (410) and then the web browser (412). The music application is thus afforded full volume while the other applications are assigned a lower volume.

FIG. 4B illustrates a second example of the virtual proximities wherein a new application has become active. In one example, a user receives a call on a voice communication application (414). Thus, the voice communication application (414) becomes active. When this happens, the virtual proximity of all the applications may be recalculated. Because the voice communication, by its type, is considered to be closer in virtual proximity, it becomes the closest. Other actors such as recentness of use may also affect the proximity calculation. Because the voice communication application (414) is closest in virtual proximity, it is given a normal volume setting. This may apply to both the microphone and the speaker.

In some cases, particular applications may be muted if they are considered to be in direct conflict with the virtually closest application. For example, playing music may interfere with a voice call, thus the user may set the music application (408) to be muted if certain applications such as the voice communication application (414) are in closer virtual proximity to the user. Alternatively, the user may wish only to reduce the volume of the music application to an ambient level in case of a voice call.

Furthermore, in some cases an application may be muted if it is past a threshold distance from the user. Specifically, if an application has at least four applications in closer proximity to the user, then that application may simply be muted.

FIG. 5 is a flowchart showing an illustrative method for automatic volume adjustment. According to certain illustrative examples, the method includes, with a computing system, determining (block 502) a virtual proximity between a user and a number of applications running on the computing system, the virtual proximity based in part on a type of one of the number of applications, and automatically adjusting (block 504) a volume of the number of applications linked with a sound peripheral connecting to the computing system, the volume of each of the number of media applications being based on the virtual proximity.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for automatic volume adjustment performed by a physical computing system, the method comprising:
   with said computing system, determining a virtual proximity between a user and a number of applications running on said computing system, said virtual proximity based in part on a type of one of said number of applications; and
   with said computing system, automatically adjusting a volume of said number of applications linked with a sound peripheral connecting to said computing system, said volume of each of said number of applications being based on said virtual proximity.

2. The method of claim 1, wherein said sound peripheral comprises a microphone and automatically adjusting said volume of applications linked with said microphone comprises adjusting a recording volume of at least one of said applications.

3. The method of claim 1, wherein said number of applications includes sub-applications or multiple instances of a single application.

4. The method of claim 1, wherein an application with a smaller virtual proximity is adjusted to a greater volume.

5. The method of claim 1, wherein an application with a greater virtual proximity is adjusted to a lower volume.

6. The method of claim 1, wherein a communication type of media application is assigned a smaller virtual proximity than another type of application.

7. The method of claim 1, wherein a virtual proximity of one of said number of applications is further based on recentness of use.

8. The method of claim 1, wherein a virtual proximity of one of said number of applications is further based on a position of said application within a user interface.

9. The method of claim 1, wherein a volume of an application is muted if it is one of: past a threshold virtual proximity or in direct conflict with another type of application.

10. The method of claim 1, wherein a user is provided with the ability to manually assign a static virtual proximity to one of said number of applications.

11. A computing system comprising:
a processor; and
a memory communicatively coupled to said processor;
in which said processor is configured to:
  determine a virtual proximity between a user and a number of applications running on said computing system, said virtual proximity based in part on a type of one of said number of applications; and
  automatically adjust a volume of said number of applications linked with a sound peripheral connecting to said computing system, said volume of each of said number of applications being based on said virtual proximity.

12. The system of claim 11, wherein said sound peripheral comprises at least one of: a set of speakers and a microphone.

13. The system of claim 11, wherein said number of applications includes sub-applications or multiple instances of a single application.

14. The system of claim 11, wherein an application with a smaller virtual proximity is adjusted to a greater volume.

15. The system of claim 11, wherein an application with a greater virtual proximity is adjusted to a lower volume.

16. The system of claim 11, wherein a communication type of media application is assigned a smaller virtual proximity than another type of application.

17. The system of claim 11, wherein a virtual proximity of one of said number of applications is further based on recentness of use.

18. The system of claim 11, wherein a virtual proximity of one of said number of applications is further based on a position of said application within a user interface.

19. The system of claim 11, wherein a volume of an application is muted if it is one of: past a threshold virtual proximity or in direct conflict with another type of application.

20. A computer program product for automatic volume adjustment, said computer program product comprising:
a computer readable storage device having computer readable code embodied therewith, said computer readable program code comprising:
  computer readable program code configured to determine a virtual proximity between a user and a number of applications running on said computing system, said virtual proximity based in part on a type of one of said number of applications; and
  computer readable program code configured to automatically adjust a volume of said number of applications linked with a sound peripheral connecting to said computing system, said volume of each of said number of applications being based on said virtual proximity.

* * * * *